W. R. STOKELY.
FRUIT BOX.
APPLICATION FILED SEPT. 24, 1907.
904,571.
Patented Nov. 24, 1908.
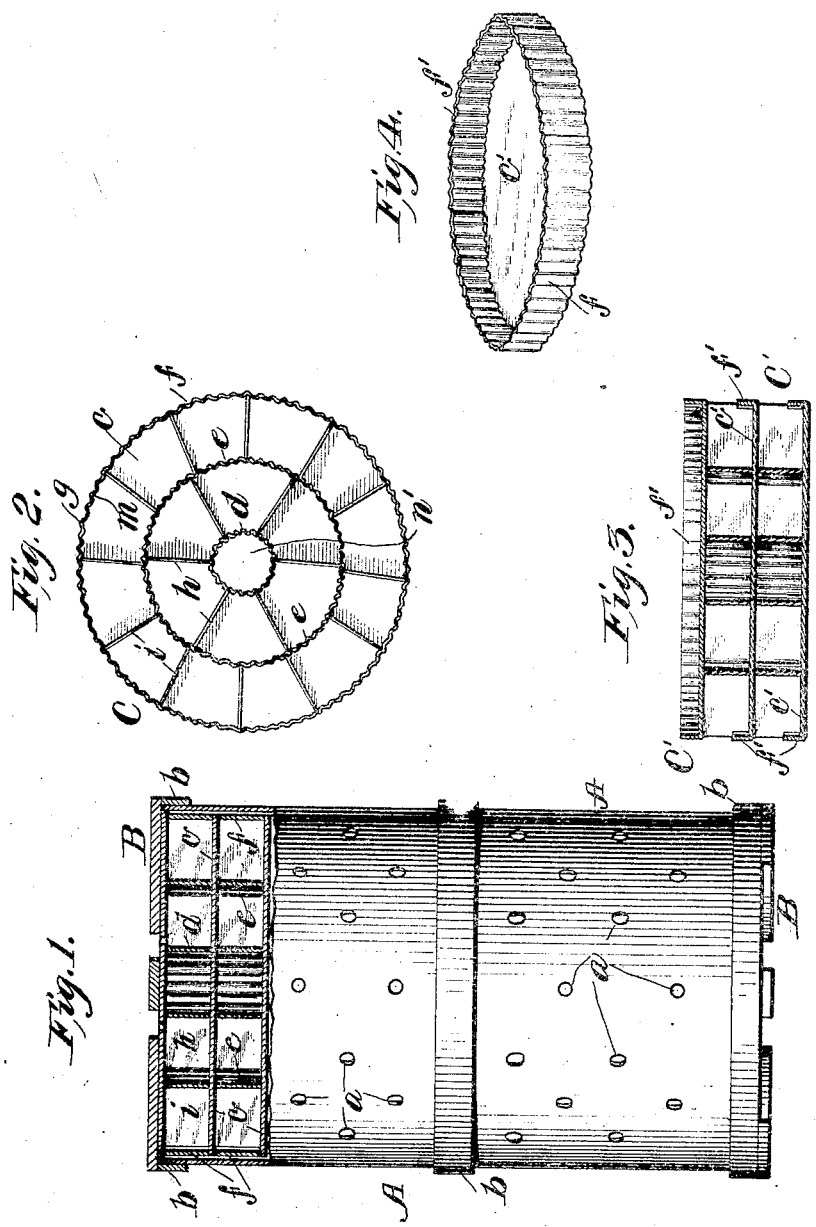

UNITED STATES PATENT OFFICE.

WELLS R. STOKELY, OF ST. AUGUSTINE, FLORIDA.

FRUIT-BOX.

No. 904,571.   Specification of Letters Patent.   Patented Nov. 24, 1908.

Application filed September 24, 1907.  Serial No. 394,298.

*To all whom it may concern:*

Be it known that I, WELLS R. STOKELY, citizen of the United States, residing at St. Augustine, in the county of St. Johns and State of Florida, have invented new and useful Improvements in Fruit-Boxes, of which the following is a specification.

My invention has reference to fruit boxes, more particularly fruit boxes of the cylindrical type; and it contemplates the provision in a fruit box of a simple and inexpensive construction, whereby partitions interposed between pieces of fruit or vegetables may be adjusted to a nicety to snugly fit pieces of fruit or vegetables of varying sizes and yet may be positively fixed to the walls between which they extend, this latter being materially advantageous since the positive engagement between the partitions and the walls precludes falling of the partitions in the event of any of the pieces of fruit or vegetables withering or otherwise shrinking in size.

Other advantageous features peculiar to my invention will be fully understood from the following description and claim when the same are read in connection with the accompanying drawings, forming part of this specification, in which:

Figure 1 is a view partly in elevation and partly in vertical section of a fruit box constituting one embodiment of my invention. Fig. 2 is a plan view of one of the fruit or vegetable holders, removed from the box. Fig. 3 is a detail, diametrical section illustrative of modified fruit or vegetable holders, and: Fig. 4 is a perspective view showing one of the trays or flanged bottoms of the holders shown in Fig. 3.

Referring by letter to the said drawings, and more particularly to Figs. 1 and 2 thereof: A is the body of the box which is preferably cylindrical in form and is provided with apertures $a$ for ventilating purposes and is also provided with hoops $b$. The ends of the said body A may be closed by any suitable means, though I prefer to employ for the purpose heads B which are similar in construction to the heads constituting the subject matter of my contemporary application of even date herewith, Serial Number 394,295.

Superposed or arranged one above the other in the body A and extending from the lower end to the upper end thereof are the fruit-holders C of my invention. These fruit holders C are identical in construction and therefore a detailed description of the one shown at the top of Fig. 1 and in Fig. 2 will suffice to impart a definite understanding of all. The mentioned fruit holder C comprises a horizontal partition or bottom wall $c$ which is circular in form and of a diameter to fit snugly within the cylindrical body A, inner, intermediate and outer circular walls $d$, $e$, and $f$, respectively arranged on and extending upward from the bottom wall $c$, and corrugated or fluted, as indicated by $g$, radial partitions $h$ extending between the circular walls $d$ and $e$, and radial walls $i$ extending between the circular walls $e$ and $f$. The said bottom wall, circular walls and partitions are formed of pasteboard because of the lightness and cheapness of such material, but in this connection I desire it understood that the said walls and partitions may be formed of any material compatible with the purpose of my invention without involving departure from the scope of my invention as defined in the claim appended.

It will be appreciated from the foregoing that the corrugations $g$ of the circular walls of the holders C afford vertical ways or grooves $m$ at frequent intervals in the length of the walls, and that the partitions $h$ and $i$ may be readily placed in and removed from opposite ways or grooves of the walls, and when so placed there is no liability of the partitions casually falling or becoming displaced. In other words, the engagement between the partitions and the circular walls is a positive one resulting in the partitions being firmly held in an upright position, and hence in the event of a piece of fruit or a vegetable contained in a compartment $n$ spoiling and shrinking in size the partitions at opposite sides of the said compartment are not liable to fall or be moved out of position. It will further be appreciated that the pieces of fruit or vegetables may be taken as they come and packed in the compartments $n$, this for the reason that the partitions $h$ and $i$ may because of the frequent ways or grooves $m$ be positively fixed at various distances apart so as to snugly receive pieces of fruit or vegetables of various sizes between them.

In packing my novel fruit box, the contents of the box are built up from the bottom—that is to say, a wall $c$ is placed on the lower head B, and circular walls $d$, $e$ and $f$ are placed upon said wall $c$. A piece of fruit or a vegetable is then placed in the central compartment $n'$, and pieces of fruit or vegetables are placed between the walls $d$ and $e$ and between the walls $e$ and $f$, and the partitions $h$ and $i$ are arranged in opposite ways or grooves $m$ and between the pieces of fruit or vegetables so that the compartment $n$ for each piece of fruit or each vegetable nicely fits and snugly contains the same. Now while I have described the walls $d$, $e$ and $f$ as circular walls, it is obvious that the said walls may be formed of strips of material, and that the ends of the said strips may be lapped to a greater or less extent in order to increase or lessen the diameters of the walls as occasion demands.

After a horizontal course of fruit or vegetables is packed in the box in the manner described, a second wall $c$ is positioned on the upper edges of the walls $d$, $e$, $f$ $h$ and $i$, and another horizontal course of fruit is arranged in the box in the manner before described, and this operation is continued until the body A is filled with superposed holders and courses of fruit or vegetables from its lower end to its upper end shown in Fig. 1.

In practice the circular walls $d$, $e$ and $f$ and the partitions $h$ and $i$ may be imperforate as illustrated, or may be provided with perforations for ventilating purposes in the discretion of the manufacturers and users of the box.

In Figs. 3 and 4 of the drawings I have illustrated modified holders C′ designed to be superposed in the manner described with reference to the holders C. The said holders C′ are similar in construction to the holders C with the exception that each is provided on its bottom wall $c'$ with an integral circumferential flange $f'$ which takes the place of the before described circular wall $f$ and is similarly corrugated and is designed to serve the same purpose as the wall $f$ with respect to the partitions $i$. By reference to Fig. 3 it will be seen that the said flange $f'$ is of a less height than the partitions $h$ and $i$ and the walls $d$ and $e$ in about the proportion shown, and by virtue of this provision, it will be apparent that when a course of fruit is lifted from the box, and viewed in edge elevation, the pieces of fruit or vegetables in the outer circle will be plainly visible through the space between the upper edge of the flange $f'$ and the next upper bottom wall $c'$. It will also be apparent that the bottom walls $c'$ provided with flanges $f'$ in the manner described are adapted to be used after the manner of trays for conveniently carrying the fruit or vegetables.

In addition to the advantages hereinbefore ascribed to my novel fruit box, it may be stated that the box is inexpensive in construction and light in weight, and yet is well adapted to withstand the usage to which such boxes are ordinarily subjected.

Having described my invention, what I claim and desire to secure by Letters-Patent, is:

The herein described fruit box comprising a cylindrical body, means for closing the ends of said body, and circular holders for fruit or vegetables snugly fitting and superposed in the body from the bottom to the top thereof and respectively made up of a bottom wall, an outer or marginal circular wall arranged on and rising from the outer portion of the bottom wall and also arranged against the inner side of the side wall of the body, inner and intermediate circular walls removably arranged on and extending upward from the bottom wall and also arranged concentrically, relative to each other and the outer circular wall; said outer, inner and intermediate, circular walls being corrugated, whereby they are provided with closely arranged upright ways or grooves, and radially-disposed, partitions removably arranged on the bottom wall and between the circular walls and positively held in ways or grooves of the latter.

In testimony whereof I have hereunto set my hand in presence of two subscribing witnesses.

WELLS R. STOKELY.

Witnesses:
N. C. HEALY,
THOMAS E. TURPIN.